Oct. 2, 1962

J. R. PRIOR 3,056,479

SPEED RATIO CONTROLLING STEERING SYSTEM
FOR TRACK-LAYING VEHICLES

Filed Sept. 24, 1959

INVENTOR.
John R. Prior
BY
G.E. McGlynn Jr.
ATTORNEY

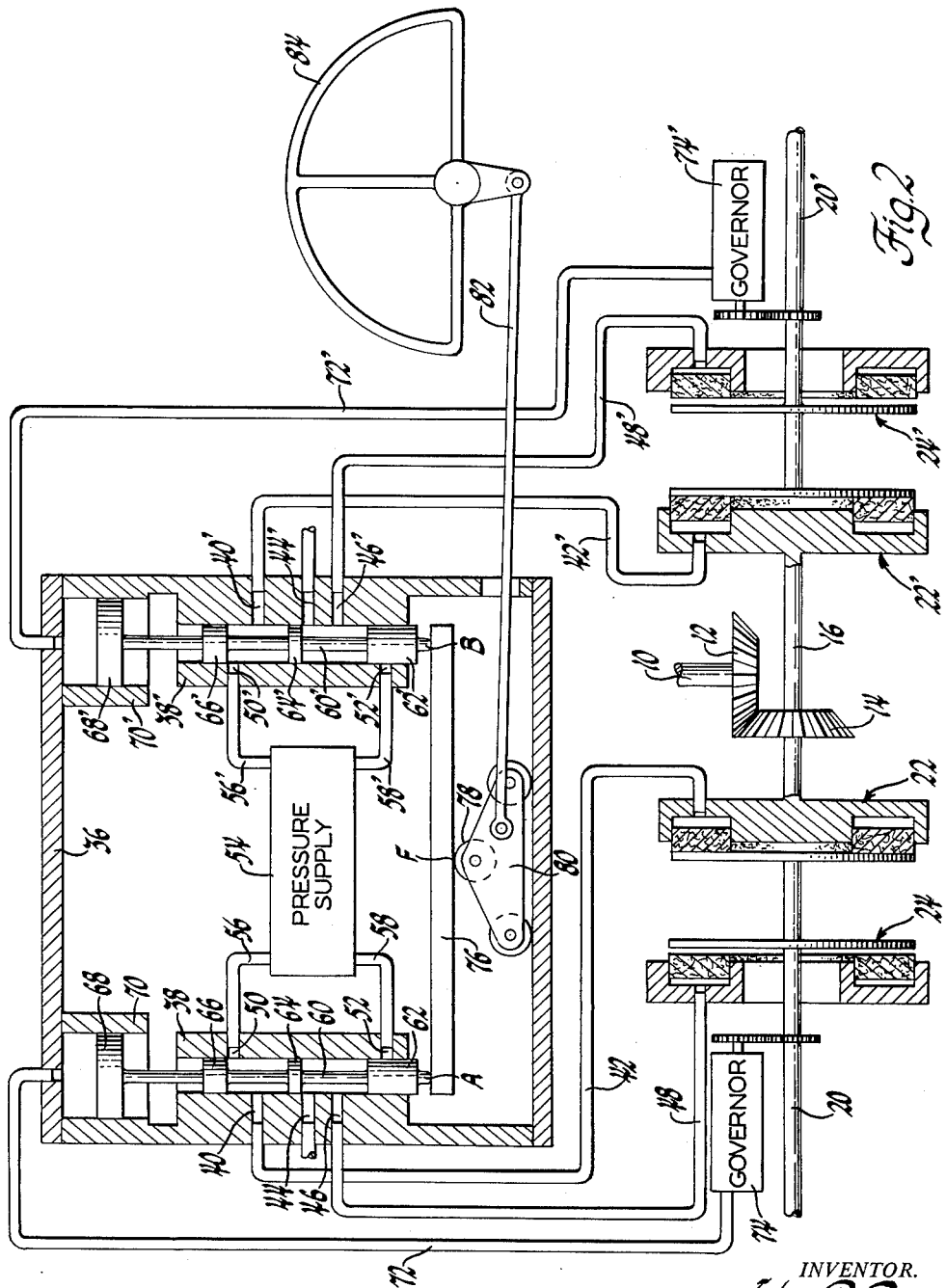

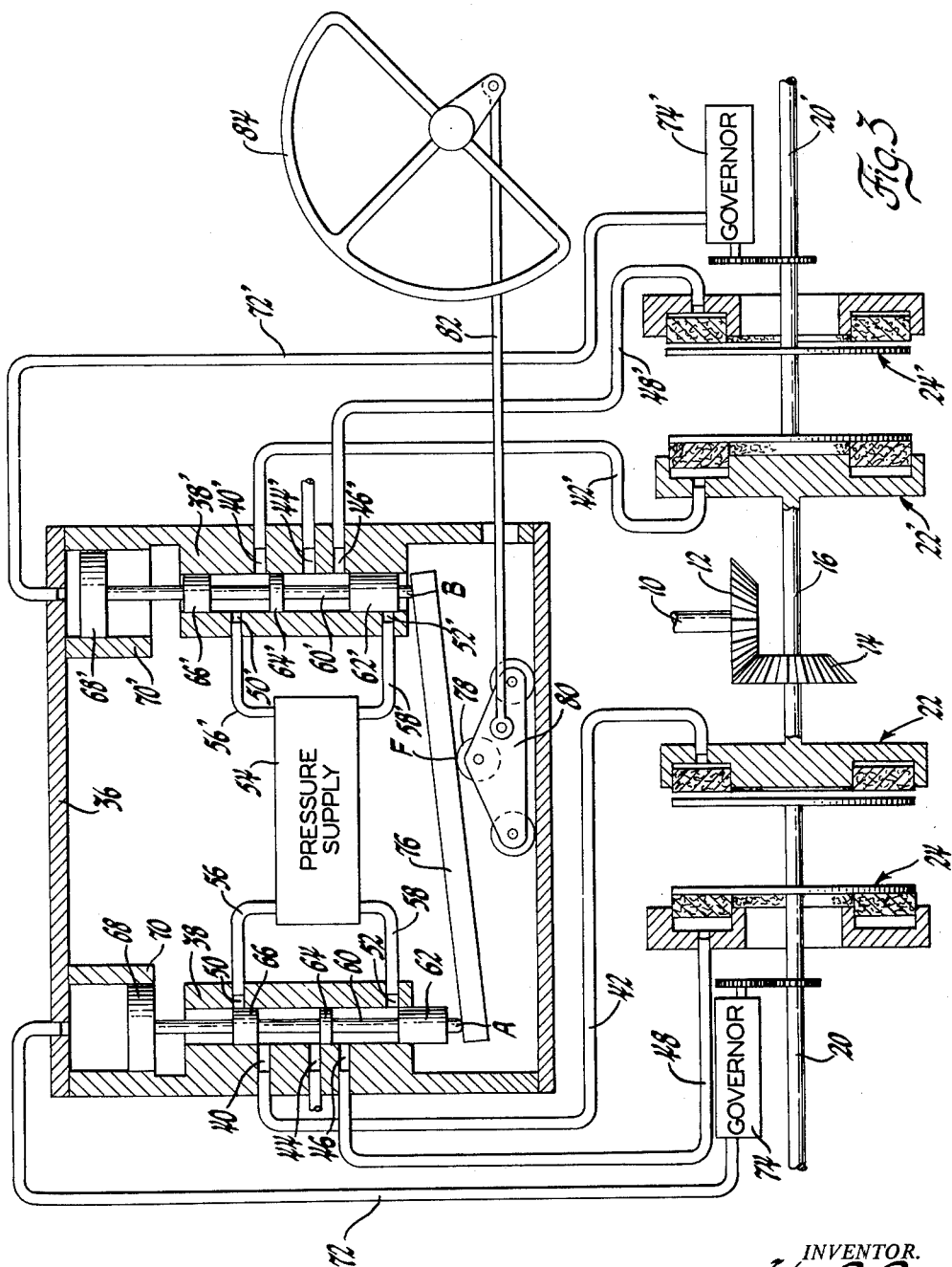

United States Patent Office 3,056,479
Patented Oct. 2, 1962

3,056,479
SPEED RATIO CONTROLLING STEERING SYSTEM FOR TRACK-LAYING VEHICLES
John R. Prior, Pontiac, Mich., assignor to General Motors Corporation, Detroit, Mich., a corporation of Delaware
Filed Sept. 24, 1959, Ser. No. 842,019
8 Claims. (Cl. 192—13)

The present invention is directed to a system for controlling the speed ratio of two power driven shafts and, in particular, to such a control system utilized in steering a track-laying vehicle.

With respect to the following description of an illustrative embodiment of the invention in association with the steering system of a track-laying vehicle, it may be noted that such vehicles typically comprise a pair of endless crawler tracks which support the vehicle on the ground and are respectively adapted to be driven by sprockets powered through a suitable engine and final drive transmission. The final drive transmission of such vehicles commonly comprises means for varying the angular speed of one sprocket relative to the other to vary speed of the crawler tracks, thereby enabling the vehicle to turn in varying degrees in a selected direction. Various arrangements are used to accomplish this steering action including those commonly termed clutch-brake, geared-steer, controlled-differential and regenerative steering systems. These types of steering systems or final drive transmissions are characterized by controlling hydraulic pressure applied to a piston which will apply or release a clutch or brake to obtain a desired relative track speed.

For example, a clutch-brake system will include a clutch-brake set associated with each of the driving sprockets, with each set adapted to be actuated selectively by fluid pressure to control the speed ratio of the sprockets. Thus, in making a full left turn, the left clutch may be disengaged and the left brake completely engaged, while the right clutch is engaged and the right brake is disengaged to cause the vehicle to pivot to the left about its left track. On the other hand, a larger steering radius may be obtained by slipping the left clutch while perhaps slightly retarding the left sprocket with the left brake while driving with the right track as aforedescribed.

While much effort and experimentation has gone into improving and further developing various steering arrangements of these types, it may be fairly observed that such arrangements are still relatively crude in failing to provide a fineness of sterring control under the extreme operating conditions to which vehicles of this type are subjected. As will be obvious, the attainment of a particular desired steering action or steering radius will depend on various factors such as the coefficients of friction of the clutches and brakes which are variably applied to accomplish steering, and variation in the loads imposed on the respective driving sprockets and their driven tracks. For example, assuming a turn is being made in any given direction, the outside track which is traveling relatively faster than the inside track may ride into soft material such as sand which offers a greater load to the outside sprocket. Under such circumstances, the outside track will be retarded to disrupt the selected turning radius. The same problem is presented when the vehicle is being steered straight-ahead. As will be readily appreciated by those skilled in the art, various combinations of these factors make it necessary for the vehicle operator to continuously manually adjust the steering mechanism of the tractor to keep the latter in the desired path.

In view of the above considerations, it is a principal object and feature of this invention to provide a speed ratio control system for relatively precisely controlling the speed ratio between two power driven shafts irrespective of variation in the respective loads applied to the shafts and other factors tending to disrupt a selected speed ratio.

It is yet another object and feature of this invention to provide a system for selecting and accurately controlling the speed ratio between the two drive sprockets of a track-laying vehicle so as to maintain the latter substantially in a selected steered direction irrespective of forces which otherwise would tend to interfere with the selected steering action.

In general, these and other objects of this invention are attained in a system comprising fluid pressure circuits respectively connected to a fluid pressure operated final drive transmission associated with each sprocket of a track-laying vehicle, a steering valve in each circuit selectively controlling the drive transmission to each sprocket, a governor associated with each sprocket to generate a control pressure in response to the angular speed of the respective sprockets, the control pressures being in communication with the respective steering valves to position the latter in accordance with a selected sprocket speed ratio, and a manually operable steering mechanism including motion-transmitting means interconnecting the steering valves for selecting a particular speed ratio for steering purposes.

The nature of this invention will become more apparent hereinafter as the description proceeds, and in which reference is made to the following drawings in which:

FIGURE 2 is a schematic representation of the steering system disposed for steering the vehicle straight ahead; and FIGURE 3 is a view corresponding to FIGURE 2 with the system adjusted for a left turn.

Figure 1:
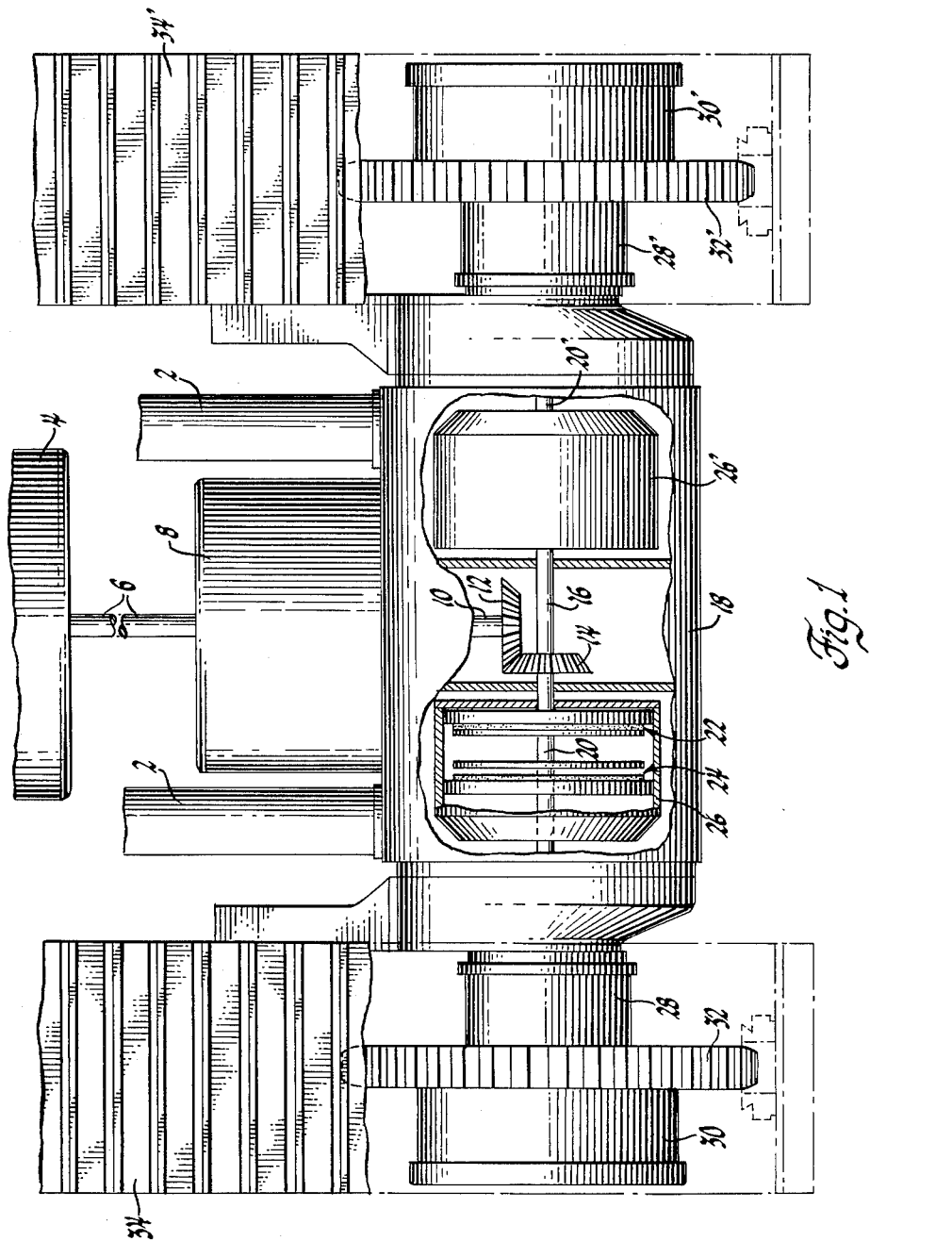
FIGURE 1 is a partial schematic plan view of a track-laying vehicle equipped with the present invention.

For the purpose of illustrating a preferred embodiment of the invention, the latter is depicted in the drawings in conjunction with a conventional final drive transmission of the clutch-brake type in which a fluid pressure operated clutch-brake set is associated with each of the tractor driving sprockets so as to be alternately and variably applied to retard or speed up one sprocket relative to the other for steering purposes. Inasmuch as such a final drive transmission is well known and in and of itself forms no part of the present invention, the latter being usable with the various types of steering systems aforementioned, the final drive transmission and other well known and conventional components are shown schematically in the drawings in order not to obscure the invention. Inasmuch as the control system includes identical components for the left and right vehicle tracks, primed numerals will be employed to indicate components associated with the right track corresponding to those identified with the left track.

The crawler or track-laying vehicle illustrated in FIGURE 1, being of conventional construction, includes a main chassis 2 on which there is mounted a suitable power plant 4 conducting torque through the power output shaft 6 to a conventional transmission located in the housing 8. The transmission output shaft 10 includes a power output bevel gear 12 meshingly engaging a similar bevel gear 14 secured to a cross-drive shaft 16 suitably rotatably supported within a final drive transmission housing 18. The opposite ends of the cross-drive shaft 16 are adapted to be selectively engaged or disengaged with the left and right sprocket driving shafts 20 and 20′ by means of fluid pressure operated clutches 22 and 22′ of conventional construction, there being fluid pressure operated brakes 24 and 24′ adapted to selectively retard or stop rotation of the respective sprocket shafts. Each clutch-brake set 22, 24 and 22′, 24′ is located within the respective housings 26 and 26'. As is conventional practice, the respective sprocket drive shafts 20 and 20' extend through axle housings 28 and 28' rigidly bolted to the end plates of the final drive housing 18 and, usually through a suitable planetary reduction gearing, are drivingly connected to exterior rotatable wheel hubs 30 and 30' to which the drive sprockets 32 and 32' are respectively rigidly connected for driving engagement with the endless crawler tracks 34 and 34'. Thus, it will be understood that power is transmitted to each of the left and right drive sprockets 32 and 32' to propel the crawler tracks and the vehicle across the terrain.

Referring now to FIGURES 2 and 3, the numeral 36 indicates a steering control housing suitably located on the vehicle. In the control housing, there are located left and right steering control valve housings 38 and 38', respectively, each comprising a clutch pressure port 40 and 40' communicating through conduits 42 and 42' with the fluid pressure operated pistons of the respective clutches 22 and 22', exhaust ports 44 and 44' suitably connected to a fluid reservoir, not shown, and brake pressure ports 46 and 46' communicated by the conduits 48 and 48' to the fluid pressure operated pistons of the respective brakes 24 and 24'. Clutch and brake pressure inlet ports are indicated at 50, 50' and 52, 52', respectively, and communicate with a common clutch and brake pressure supply 54 through conduits 56, 56' and 58, 58', respectively.

The valve spools 60 and 60' are reciprocably disposed within the valve housings 38 and 38', and are identical in comprising three axially spaced lands 62 and 62', 64 and 64', 66 and 66' coaxially mounted with respect to piston heads 68 and 68' having equal diameters and reciprocably disposed within the cylindrical housings 70 and 70'. The cylinders communicate through conduits 72 and 72' with governors 74 and 74' which are suitably drivingly connected to the respective left and right sprocket output shafts 20 and 20'. These governors are conventional devices, well known in the art, which deliver or regulate hydraulic pressure as a function of the angular speed of the governor in response to angular rotation of the sprocket output shafts. A commonly used type of governor provides a pressure which is proportional to the square of its angular speed.

Each of the valve spools 60 and 60' bears against or is articulately connected to an end of a teeter bar or lever 76 at the positions indicated as A and B, respectively. The teeter bar or lever is supported at a fulcrum point F on a roller 78 mounted on a trolley or support 80 movable along the length of the lever by a suitable mechanical linkage such as the rod 82 connected to the vehicle steering wheel 84.

The operation of the inventive system will first be described with reference to FIGURE 2 of the drawings in which the various components are disposed so as to provide straight ahead steering action for the vehicle; i.e., a condition in which the angular speeds of both of the sprocket output shafts 20 and 20' are substantially equal. With the vehicle steering wheel 84 disposed for straight ahead steering, the movable dolly or trolley 80 positions the fulcrum point F equidistantly from the connection of the teeter bar or lever 76 to the ends of the respective valve spools 60 and 60'. Ignoring for the moment external loads and other extraneous forces imposed upon the driving sprockets, the valve spools will be located as shown in FIGURE 2 of the drawings in which fluid under pressure is communicated from supply 54 through conduits 56 and 56' and respective clutch pressure ports 40 and 40' to apply the fluid operated motor member of the left and right clutches 22 and 22' thereby conducting drive from the cross drive shaft 16 to the respective sprocket output shafts 20 and 20'. The lands 62 and 62' of each valve spool cooperate to cut off supply of fluid pressure from the conduits 58 and 58' to the respective brakes 24 and 24' while permitting these brakes to be exhausted across the ports 46 and 44 and 46' and 44'. Thus, theoretically, both tracks will be driven at the same speed.

With the vehicle being steered straight ahead, the control pressures generated by the left and right hand governors 74 and 74', respectively, are applied through the conduits 72 and 72' to the cylinders 70 and 70' to act against the pistons 68 and 68' which urge the respective valve spools into engagement or against the ends of the teeter bar or lever 76. When the respective speeds of the sprocket output shafts are equal, it will be readily apparent that the pressures generated by the respective governors are equal and, since the areas of the piston heads 68 and 68' are equal and the fulcrum F is located midway between the connection of the teeter bar or lever to the respective valve spools, the system is in equilibrium and there is no force present which will change the positions of the steer control valves. Thus, the vehicle steers straight ahead.

With the steering wheel still disposed in the straight ahead steering position of FIGURE 2, it may be assumed for the sake of example that the right hand track rolls into a sandy area or otherwise meets increased rolling resistance as compared to the left track. The result is an increased load on the right sprocket output shaft 20', and a condition in which the speed of this shaft is retarded relative to the speed of the left sprocket shaft 20. As a consequence, the left governor control pressure exceeds that supplied by the right governor which results in the teeter bar tipping counterclockwise about the fulcrum F to a variable extent depending upon the relative speed ratios of the sprocket output shafts. As the valve spool 60 moves downwardly in the drawing, the valve land 66 will variably pinch off communication between the supply conduit 56 and the clutch outlet port 40, if not interrupt communication all together, while the land 64 variably opens the exhaust port 44 to dump the clutch motor while the port 52 is variably opened or completely opened by land 62 for communication with the brake port 46 to apply the brake 24. Upward movement of the spool 60' has no effect on the system. Depending on the extent of speed ratio variation, therefore, it will be seen that the left sprocket output shaft 20, which is going too fast relative to the selected straight ahead steering speed ratio, is retarded until the selected 1:1 speed ratio is again attained. Attainment of this preselected ratio may be accomplished by continuing to retard the speed of the left output shaft or, perhaps, by the right track rolling up out of the sand or other material offering the increased rolling resistance at which time the pressure generated by the respective governors 74 and 74' again balance each other and the valve spools again attain the positions shown in FIGURE 2.

In FIGURE 3, the mechanism is illustrated as accomplishing a full left hand turn in which the left track is retarded relative to the right track. When the steering wheel is turned to the left, the fulcrum point F is moved along the teeter bar or lever 76 from its center position in which $FA = FB$ toward the point B in which, obviously, the lever arm FA is greater than the lever arm FB. At the time that the fulcrum point F was first moved, the pressures generated by the respective governors were equal. Thus, since the areas of the piston heads 68 and 68' are equal and the lever arm FA is greater than the lever arm FB, the valve spool 60 will be displaced downwardly while the valve spool 60' will raise upwardly, with no effect on the system, until equilibrium is again established. Thus, the left hand valve spool 60 causes release of the clutch 22 and application of brake 24, while the right hand valve spool 60' continues to apply the clutch 22' with brake 24' released to direct full power to the right sprocket shaft 20'. The system again reaches an equilibrium point conditionsd for the selected turn when the reduced governor pressure on the left side acting through the longer lever arm is balanced by the larger governor pressure on the right side acting through the shorter lever arm.

It will be readily apparent from the foregoing description of operation with respect to FIGURE 2, that in the steered position of FIGURE 3 or any other steering position the system will function to compensate for undesired variations in the selected sprocket shaft speed ratio. In other words, even in the steered position of FIGURE 3, the system will respond to various external forces to maintain a selected speed ratio.

At this juncture, it should be noted that the steering control valves in FIGURES 2 and 3 are shown in two extreme positions; i.e., in FIGURE 2, there is illustrated one extreme position in which the respective clutches 22 and 22' are fully applied and brakes 24 and 24' are fully released. In FIGURE 3, the valve 60 is shown in another extreme position in which the clutch 22 is fully released and the brake 24 fully applied. However, it will be readily appreciated that each of the valves has an infinite number of positions between these extreme positions in which the respective clutches and brakes can be variably slipped. Thus, in FIGURE 3 there is illustrated a turn to the left in which the right track walks about the left track to give a minimum steer radius equal substantially to one half the distance between the vehicle tracks. For larger steer radii, it will be understood that both tracks will remain in forward motion but at different relative speeds. Such larger steer radii are provided by permitting the brake on the retarded side of the vehicle to be slipped rather than locked. In turns under heavy load conditions, such as climbing a steep hill, the clutch on the inside track would be only partially released and therefore permitted to slip.

It will therefore be seen from the foregoing description that the present invention provides a means for accurately controlling the speed ratio between two shafts whose relative speeds are controlled by the application or release of hydraulic pressure upon fluid pressure operated motors which engage, release or slip clutches, brakes or the like. Moreover, the inventive steering system provides very fine steering control resulting in maintenance of a selected speed ratio between sprocket output shafts regardless of the actual speed of either shaft. Additionally, the speed ratio may be varied simply by adjusting a movable fulcrum, while releasing the vehicle operator of accounting for variations in load, clutch friction coefficients and other similar factors.

While but one form of the invention has been selected for an illustration thereof, other forms will be apparent to those skilled in the art. Therefore, the embodiment shown in the drawing is merely for illustrative purposes, and is not intended to limit the scope of the invention which is defined by the claims which follow.

I claim:

1. A speed ratio controlling system for a pair of driven shafts, driving means, fluid pressure operated drive transmission means controlling the drive connection between each of said shafts and said driving means, a fluid circuit including a source of fluid pressure connected to each of said transmission means, a fluid pressure operated control valve in each circuit selectively controlling the operation of said respective transmission means, means operatively associated with said driven shafts for generating control pressures respectively proportional to the angular speed of each of said shafts, means for connecting said control pressures respectively to said control valves to automatically adjust the latter in accordance with the speed ratio of said shafts, and manually operable means operatively connected to said control valves to position the latter independently of said control pressures.

2. A speed ratio controlling system for a pair of driven shafts, driving means, fluid pressure operated drive transmission means controlling the drive connection between each of said shafts and said driving means, a fluid circuit including a source of fluid pressure connected to each of said transmission means, a fluid pressure operated control valve in each circuit selectively controlling the operation of said respective transmission means, means operatively associated with said driven shafts for generating control pressures respectively proportional to the angular speed of each of said shafts, means for connecting said control pressures respectively to said control valves to automatically adjust the latter in accordance with the speed ratio of said shafts, and a manually operable control mechanism including motion-transmitting means interconnecting said control valves to position the latter independently of said control pressures.

3. A speed ratio controlling system for a pair of driven shafts, driving means, a fluid pressure operated clutch-brake set controlling each of said shafts, said clutches being operable selectively to engage and disengage said respective shafts and said driving means, said brakes being operable selectively to retard or free said respective shafts for rotation, a fluid circuit including a source of fluid pressure connected to each of said clutch-brake sets, a control valve in each of said circuits and including a housing having ports connecting said source to each clutch-brake set, a movable valve spool in each of said housings including piston heads of equal area, a governor operatively drivingly connected to each of said shafts and providing control pressures proportional to the angular speed of the respective shafts, means for connecting said control pressures respectively to said housings to act on said pistons to adjust said movable valve spools in accordance with the speed ratio of said shafts, and a manually operable control mechanism including motion-transmitting means interconnecting said valve spools to position the latter independently of said control pressures.

4. A speed ratio controlling steering system for a track-laying vehicle comprising a pair of endless tracks, a driven sprocket connected to each of said tracks, driving means, fluid pressure operated drive transmission means controlling the drive connection between each of said sprockets and said driving means, a fluid circuit including a source of fluid pressure connected to each of said transmission means, a fluid pressure operated steering control valve in each circuit selectively controlling the operation of said respective transmission means, means operatively associated with the driven sprockets for generating control pressures respectively proportional to the angular speed of each of said sprockets, means for connecting said control pressures respectively to said steering valves to automatically adjust the latter in accordance with the speed ratio of said sprockets, and a manually operable steering mechanism operatively connected to said control valves to position the latter independently of said control pressures.

5. A speed ratio controlling steering system for a track-laying vehicle comprising a pair of endless tracks, a driven sprocket connected to each of said tracks, driving means, fluid pressure operated drive transmission means controlling the drive connection between each of said sprockets and said driving means, a fluid circuit including a source of fluid pressure connected to each of said transmission means, a fluid pressure operated steering control valve in each circuit selectively controlling the operation of said respective transmission means, means operatively associated with the driven sprockets for generating control pressures respectively proportional to the angular speed of each of said sprockets, means for connecting said control pressures respectively to said steering valves to automatically adjust the latter in accordance with the speed ratio of said sprockets, and a manually operable steering mechanism including motion-transmitting means interconnecting said steering valves to position the latter independently of said control pressures.

6. A speed ratio controlling steering system for a track-laying vehicle comprising a pair of endless tracks, a driven sprocket connected to each of said tracks, driving means, fluid pressure operated drive transmission means controlling the drive connection between each of said sprockets and said driving means, a fluid circuit including a source of fluid pressure connected to each of said transmission means, a fluid pressure operated steering control valve in each circuit selectively controlling the operation of said respective transmission means, means operatively associated with the driven sprockets for generating control pressures respectively proportional to the angular speed of each of said sprockets, means for connecting said control pressures respectively to said steering valves to automatically adjust the latter in accordance with the speed ratio of said sprockets, and a manually operable steering mechanism including motion-transmitting means interconnecting said steering valves.

7. A speed ratio controlling steering system for a track-laying vehicle comprising a pair of endless tracks, a driven sprocket connected to each of said tracks, driving means, fluid pressure operated drive transmission means controlling the drive connection between each of said sprockets and said driving means, a fluid circuit including a source of fluid pressure connected to each of said transmission means, a fluid pressure operated steering control valve in each circuit selectively controlling the operation of said respective transmission means, means operatively associated with the driven sprockets for generating control pressures respectively proportional to the angular speed of each of said sprockets, means for connecting said control pressures respectively to said steering valves to automatically adjust the latter in accordance with the speed ratio of said sprockets, a lever interconnecting said steering valves, and a manually operable steering mechanism including a movable fulcrum engaging said lever.

8. A speed ratio controlling steering system for a track-laying vehicle comprising a pair of endless tracks, a driven sprocket connected to each of said tracks, driving means, a fluid pressure operated clutch-brake set controlling each of said sprockets, said clutches being operable selectively to engage and disengage said respective sprockets and driving means, said brakes being operable selectively to retard or free said respective sprockets for rotation, a fluid circuit including a source of fluid pressure connected to each of said clutch-brake sets, a steering control valve in each of said circuits and including a housing having ports connecting said source to each clutch-brake set, a movable valve spool in each of said housings including piston heads of equal area, a governor operatively drivingly connected to each of said sprockets and providing control pressures proportional to the angular speed of the respective sprockets, means for connecting said control pressures respectively to said housings to act on said pistons to automatically adjust said movable valve spools in accordance with the speed ratio of said sprockets, a lever interconnecting said valve spools, and a manually operable steering mechanism including a movable fulcrum engaging said lever.

References Cited in the file of this patent
UNITED STATES PATENTS

| | | |
|---|---|---|
| 2,539,862 | Rushing | Jan. 30, 1951 |
| 2,689,489 | Storer et al. | Sept. 21, 1954 |
| 2,791,918 | Frellsen | May 14, 1957 |
| 2,883,019 | Kershner et al. | Apr. 21, 1959 |
| 2,907,428 | Erwin et al. | Oct. 6, 1959 |